(12) United States Patent
Kim et al.

(10) Patent No.: US 11,758,294 B2
(45) Date of Patent: Sep. 12, 2023

(54) IMAGING SYSTEM AND METHOD FOR ACQUISITION OF MULTI-SPECTRAL IMAGES

(71) Applicant: IMEC VZW, Leuven (BE)

(72) Inventors: Joo Hyoung Kim, Leuven (BE); Jiwon Lee, Herent (BE); Jan Genoe, Testelt (BE); Robert Gehlhaar, Herent (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 17/814,614

(22) Filed: Jul. 25, 2022

(65) Prior Publication Data
US 2023/0030069 A1  Feb. 2, 2023

(30) Foreign Application Priority Data

Aug. 2, 2021 (EP) .................................. 21189074

(51) Int. Cl.
*H04N 25/13* (2023.01)
(52) U.S. Cl.
CPC ................................ *H04N 25/135* (2023.01)
(58) Field of Classification Search
CPC ............ G01J 2003/2826; G01J 3/0205; G01J 3/2803; G01J 3/36; G02B 6/29331; H04N 25/134; H04N 25/135
See application file for complete search history.

(56) References Cited

U.S. PATENT DOCUMENTS

| | | |
|---|---|---|
| 5,701,005 A | 12/1997 | Meyers |
| 6,646,682 B1 | 11/2003 | Hou |
| 9,094,567 B2 * | 7/2015 | Olson .................. H04N 25/131 |
| 2003/0067550 A1 | 4/2003 | Inokuma et al. |
| 2006/0197949 A1 | 9/2006 | Bouzid et al. |
| 2010/0188537 A1 | 7/2010 | Hiramoto et al. |
| 2014/0124650 A1 | 5/2014 | Nakamura et al. |
| 2018/0234644 A1 | 8/2018 | Li et al. |
| 2020/0077026 A1 | 3/2020 | Jeong et al. |

FOREIGN PATENT DOCUMENTS

EP    3770660 A1   1/2021

OTHER PUBLICATIONS

Extended European Search Report and Written Opinion, Application No. EP21189074.4, dated Feb. 8, 2022, 5 pages.

* cited by examiner

*Primary Examiner* — Antoinette T Spinks
(74) *Attorney, Agent, or Firm* — McDonnell Boehnen Hulbert & Berghoff LLP (57) ABSTRACT

Example embodiments relate to imaging systems and methods for acquisition of multi-spectral images. One example imaging system includes a detector that includes an array of light sensitive elements arranged in rows and columns. Each light sensitive element is configured to generate a signal dependent on an intensity of light incident onto the light sensitive element. The imaging system also includes a plurality of wavelength separating units. Each wavelength separating unit is configured to spatially separate incident light within a wavelength range into a number of wavelength bands distributed along a line. The line is a straight line. Each wavelength band along the line is associated with a mutually unique light sensitive element. Further, the imaging system includes a processing unit configured to define a number of mutually unique clusters of light sensitive elements for summing signals from the light sensitive elements within the respective clusters.

20 Claims, 7 Drawing Sheets

IMAGING SYSTEM AND METHOD FOR ACQUISITION OF MULTI-SPECTRAL IMAGES

CROSS-REFERENCE TO RELATED APPLICATIONS

The present application is a non-provisional patent application claiming priority to European Patent Application No. EP 21189074.4, filed Aug. 2, 2021, the contents of which are hereby incorporated by reference.

FIELD OF THE DISCLOSURE

The present disclosure relates to multi-spectral imaging, and more specifically to an imaging system and method for acquisition of multi-spectral images.

BACKGROUND

Imaging techniques using detection of several wavelength bands of light within the ultraviolet, visible, and infrared spectral ranges, have found widespread application ranging from multi-spectral detection for scientific measurements to photographic imaging. In order to distinguish between light of different wavelength bands, imaging devices such as digital cameras typically comprise filter arrays covering the pixels, to filter out certain wavelength bands, such that different pixels detect light intensity within different wavelength bands of the full light spectrum. A common example is cameras for photography comprising filter arrays for the colors red, green, and blue, allowing the three separate colors to be detected by respective pixels of the imaging detector. The acquired signals from the different pixels may be used to represent the intensity of the respective wavelength bands, and based on these measured intensities the wavelength composition of the incident light may be estimated.

However, conventional filters reduce the intensity of the incident light before it reaches the detector, thereby effectively reducing the sensitivity of the imaging device. One drawback of this approach is the limitations related to further downscaling of optical components.

EP 3770660 discloses a detector comprising waveguides for separating the incident light into wavelength bands. Based on a waveguiding light sorting principle, rather than based on the principle of absorption or reflection, incident light is not discarded from reaching the detector to any substantial extent, but rather split into a number of wavelength bands. The approach enables a major portion of the incident light to reach the detector. As less light is discarded in the filtering process, the overall light sensitivity of the imaging device is increased.

However, a single waveguide-based light separating unit defines a spatial relation of pixel positions at which different wavelength bands will be detected, such that the wavelength band associated with each pixel may not be freely selected. Hence, there is a need in the art for further improvements related to light sensitivity and thus to downscaling of imaging devices.

SUMMARY

Example embodiments may mitigate, alleviate, or eliminate one or more of the above-identified deficiencies in the art. These and other objectives are at least partly met by embodiments as defined in the independent claims. Additional embodiments are set out in the dependent claims.

According to a first aspect of the disclosure, there is provided an imaging system comprising:

a detector comprising an array of light sensitive elements arranged in rows and columns, wherein each light sensitive element is configured to generate a signal dependent on an intensity of light incident onto the light sensitive element;

a plurality of wavelength separating units wherein each wavelength separating unit is configured to spatially separate incident light within a wavelength range into a number of wavelength bands distributed along a line, wherein the line is a straight line, and wherein each wavelength band along the line is associated with a mutually unique light sensitive element;

wherein each of the rows is associated with more than one wavelength separating unit of the plurality of wavelength separating units, and each of the columns is associated with more than one wavelength separating unit of the plurality of wavelength separating units;

a processing unit configured to define a number of mutually unique clusters of light sensitive elements for summing signals from the light sensitive elements within the respective clusters, wherein each cluster respectively forms a continuous area of the light sensitive elements, wherein each cluster comprises light sensitive elements associated with more than one wavelength separating unit of the plurality of wavelength separating units, and wherein each cluster comprises light sensitive elements associated with wavelength bands such that the summed signals represent a combination of the spectral information of the wavelength bands, and wherein the processing unit is configured to perform hardware binning for summing the signals from the light sensitive elements within each of the mutually unique clusters respectively.

By the term "light sensitive element" is here meant an element comprising a light sensitive area reacting to light impinging onto the area, by generating an electrical signal as a response to the light intensity. An array of light sensitive elements may be arranged on a detector, configured to allow read-out of the electrical signals representing light for image acquisition. Given as non-limiting examples, light sensitive elements may be found on photodiodes, photo-multiplier tubes (PMT), and pixels on image detectors such as charge-coupled devices (CCD), complementary metal oxide semiconductors (CMOS), or a thin film detector. By way of example, an array of light sensitive elements may be in the form of pixels on a detector, but may alternatively comprise a plurality of any other type of light sensitive elements.

Typically, the array of light sensitive elements may be arranged in rows and columns in a plane of the detector, wherein the plane is a planar surface of the detector.

A light sensitive element may comprise an area outside of the light sensitive area which is not sensitive to impinging light. Therefore, a pitch of the light sensitive areas on a detector may be larger than a width of the light sensitive areas. By the term "pitch" is here meant the distance from a center of a light sensitive area to the center of a consecutive light sensitive area. In other words, the pitch includes the width of a light sensitive area as well as a separation between two consecutive light sensitive areas.

In this context the term "light" should be allowed a wider interpretation, not limited to visible electromagnetic radiation but may also include for example ultraviolet light, infrared light, or combinations thereof.

By the term "wavelength separating unit" is here meant any unit, device, and/or element with the capability of splitting light based on the wavelength of the light, into a number of wavelength bands. Given only as an example, incident light of several wavelengths within the wavelength range may be separated by having a direction of propagation altered based on the wavelength of the light, such that different wavelengths take different directions. By way of example, the wavelength separating units may comprise, but are not limited to, waveguides, prisms, and/or gratings.

The wavelength separating unit may provide 1×N wavelength bands arranged along a line. It should be understood that the light may be separated into N entities in the wavelength separating unit such that the wavelength bands are separated to optical components in the wavelength separating unit. By way of example, the incident light may be separated into N different waveguides in the wavelength separating unit, corresponding to the N wavelength bands. However, it is also conceivable that the incident light is dispersed into a continuum of wavelengths along the line of the wavelength separating unit, and that the light is split into N wavelength bands when the light reaches the N light sensitive elements on the detector, such that the N wavelength bands are defined by how the wavelength separating unit is arranged relative to the detector. Given only as examples, the N number of wavelength bands may be, but is not limited to, 2, 3, 4, or 5. According to example embodiments, the N number of wavelength bands is at least 3.

By the phrase "each wavelength band along the line is associated with a mutually unique light sensitive element" is here meant that each respective wavelength band is associated with only one light sensitive element, and vice versa. Consequently, if a wavelength separating unit provides N wavelength bands, then the wavelength separating unit is associated with N light sensitive elements. Each respective wavelength band is arranged such that light within the wavelength band will exit the wavelength separating unit to impinge on the light sensitive element with which the respective wavelength band is associated. Further, each of the wavelength separating units may be arranged on the detector such that light in consecutive wavelength bands impinges onto consecutive light sensitive elements of the detector. By way of example, each of the wavelength separating units may be arranged such that light in consecutive wavelength bands impinges onto consecutive light sensitive units along rows, along columns, along diagonals or along any other suitable direction on the detector.

Each of the rows is associated with more than one wavelength separating unit of the plurality of wavelength separating units. Further, each of the columns is associated with more than one wavelength separating unit of the plurality of wavelength separating units. As mentioned above, the wavelength separating unit typically provides 1×N wavelength bands, wherein N may be a relatively low number, such as below 10. A typical detector on the other hand may comprise a much larger number of light sensitive elements per row and per column. Thus, it is clear that in order to arrange wavelength separating units on substantially all light sensitive elements on the detector, each of the rows and each of the columns are typically associated with a substantial number of wavelength separating units.

By "mutually unique clusters" is here meant clusters comprising only light sensitive elements that do not form part of any of the other clusters. In other words, the clusters are defined not to overlap with other clusters. Typically, the processing unit may define the number of mutually unique clusters such that the entire detector is divided into clusters. In this manner the clusters are arranged next to each other, with no light sensitive elements in between the clusters that do not form part of any cluster.

All the clusters may be defined to be of the same shape and size. Given only as non-limiting examples, the cluster may be of a square or rectangular shape. Given as further, non-limiting examples, the cluster may be formed by 2 adjacent light sensitive elements along a row and 2 adjacent light sensitive elements along a column such that the cluster is formed by 2×2 light sensitive elements. Similarly, a cluster may be formed by 3×3 light sensitive elements, or 4×4 light sensitive elements, or 5×5 light sensitive elements.

It should be understood that the processing unit may be further configured to optionally define a number of macro-clusters, larger than the clusters. Macro-clusters may comprise a number of clusters, in their entirety or in part.

The signals from the light sensitive elements within a cluster may be summed such that the sum represents the spectral information of the combined wavelength bands associated with the light sensitive elements. The summing of signals from the light sensitive elements within respective clusters may be achieved by hardware binning. Hardware binning may comprise combining the signals from some or all light sensitive elements in the cluster prior to reading out the signal from the detector. In this manner, read-out noise may be reduced due to the fewer read-outs needed when the signals are combined on the detector. By way of example, the signal of a light sensitive element may be, but is not limited to, electrical charges released by the light sensitive area of the light sensitive element. Summing the signals may thus comprise adding the electrical charges together, for example prior to read-out.

In some embodiments, the color-splitting of the incident light may allow for a sensitivity enhancement of the imaging system. The sensitivity may in particular be increased in relation to other technologies utilizing color filters to filter out different wavelengths from the incoming light, since color filters typically removes unwanted wavelengths from the respective wavelength bands by absorption or reflection but do not provide a path to redirect such light to another wavelength band. With the present disclosure, it is possible to discriminate between different wavelengths bands without using color filters for controlling the wavelengths reaching the photoactive layer, thereby not losing a significant portion of the incident light before it reaches the detector.

Additionally, the signal-to-noise ratio of the detection may be improved by summation of the signals from the light sensitive elements within the respective clusters. According to the present disclosure, the wavelength separating units are arranged such that continuous area clusters are formed wherein the signals are summed for improving signal-to-noise ratio while enabling spectral information to be maintained such that the imaging system allows a spectral image to be formed. The clusters may each have an identical size such that the summed signals from each of the clusters represent a correspondingly sized area of light sensitive elements.

Each cluster may be associated with a single wavelength band, with different clusters being associated with different wavelength bands. According to an alternative, at least some clusters of light sensitive elements may be associated with a combination of different wavelength bands, whereby the signal from the clusters may represent the spectral information of the combined wavelength bands associated with the light sensitive elements. Different clusters of light sensitive elements may be associated with different combinations of wavelength bands. By way of a non-limiting example, if the wavelength bands correspond to red, green, and blue light, the combination of red and green may be used to represent the color yellow, and the combination of green and blue may be used to represent the color cyan.

According to an embodiment, each cluster comprises light sensitive elements associated with wavelength bands being overlapping and/or adjacent with respect to wavelength such that the summed signals of each respective cluster represent a wavelength interval within the wavelength range.

The wavelength bands being adjacent implies that the number of wavelength bands defined by the wavelength separating unit does not include a wavelength band in-between adjacent wavelength bands.

According to an embodiment, the line of wavelength bands of each of the wavelength separating units is arranged to extend along a row of the light sensitive elements such that each wavelength band along the line is associated with the mutually unique light sensitive element along the row, and wherein, along the respective rows, the wavelength separating units are arranged continuously, one after the other.

In some embodiments, by arranging the wavelength separating units along and parallel to the respective rows, covering the full detector with wavelength separating units may be achieved in an efficient manner. By the present arrangement, coverage of all the light sensitive elements with wavelength bands of the wavelength separating units may be provided without overlap and/or cross-talk between different wavelength bands on single light sensitive elements.

According to an embodiment, the wavelength separating units are identical and wherein, along the respective rows, the wavelength separating units are arranged with alternating orientation with respect to an order of the wavelength bands along the line.

That the wavelength separating units are arranged, along the respective rows, with alternating orientation with respect to the order of the wavelength bands should be construed as every second wavelength separating unit has a first orientation with respect to the order of the wavelength bands, and the other wavelength separating units have a second orientation being opposite to the first orientation with respect to the order of the wavelength bands. Expressed differently, along a row of light sensitive elements, the first wavelength separating unit along the row may have the first orientation, the second wavelength separating element along the row may have the second orientation, the third wavelength separating unit along the row may have the first orientation, and so on.

By way of example, the wavelength bands of each wavelength separating unit may be ordered along the line in a descending manner with respect to wavelength. If the wavelength separating units are arranged with alternating orientation, the wavelength separating units are thus arranged alternatingly in descending and ascending order. In this manner, along the row, adjacent wavelength bands of two different wavelength separating unit are of the same type. The present arrangement may be referred to as "head-to-head and tail-to-tail" configuration.

Given as a non-limiting example, each wavelength separating unit may comprise three wavelength bands corresponding to the visible colors red, green, and blue, respectively. The red wavelength band of one wavelength separating unit along the row may thus be adjacent to the red wavelength band of the next wavelength separating unit at one end. Similarly, the blue wavelength band of one wavelength separating unit along the row may thus be adjacent to the blue wavelength band of the next wavelength separating unit at the other end.

Some embodiments may allow for summation of 2×2 light sensitive elements in square shaped clusters. Further, four different combinations of wavelength bands associated with the light sensitive elements in the clusters may be provided. Thus, the clusters may be defined in four different manners such that the sum of the signals of the light sensitive elements within each of the four respective types of cluster represents four different types of spectral information. By way of example, in case the wavelength bands of the wavelength separating units correspond to the visible colors red, green, and blue, the present embodiment enables 2×2 clusters to be defined to represent the colors red, yellow, cyan, and blue. In the manner described above, a system allowing hardware binning to improve the signal-to-noise ratio of the image acquired by the detector may be provided, while the system allows maintaining good color representation.

In some embodiments, the head-to-head and tail-to-tail alternating configuration, combined with the binning of pixels from adjacent wavelength separating units, may allow the imaging system to be less sensitive to minor misalignment of the wavelength separating units on top of the pixels. Indeed, the increase of photon counts on one light sensitive element will lead to an almost corresponding decrease on the corresponding light sensitive element of the same color, leading to a change in the sum signal which is almost unchanged due to misalignment.

According to an embodiment, the wavelength separating units in adjacent rows are arranged side by side forming columns of wavelength separating units parallel to the columns of light sensitive elements.

By the present arrangement, each respective column of light sensitive elements may be associated with a single type of wavelength band. In the example of the wavelength bands of the wavelength separating units corresponding to the colors red, green, and blue, the present arrangement may form alternating red, green and blue columns.

According to an embodiment, the wavelength separating units in adjacent rows are arranged to be offset with respect to each other.

It should be understood that the wavelength separating units may be arranged in a plane parallel to the plane of the array of light sensitive elements. That the wavelength separating units in adjacent rows are arranged to be offset with respect to each other should be construed as the wavelength separating units being offset within the plane of wavelength separating units, thus in a plane parallel to the plane of the array of light sensitive elements.

By the present arrangement, each respective column may be associated with different types of wavelength band. In the example of the wavelength bands of the wavelength separating units corresponding to the colors red, green, and blue, the present arrangement may form columns of light sensitive elements associated with two or more of the wavelength bands red, green and blue.

It should be understood that not necessarily all wavelength separating units in all adjacent columns need to be offset with respect to each other. By way of example, the columns may be paired such that the wavelength separating units of the paired columns are arranged alongside each other, and in the adjacent pair of columns the wavelength separating units are also arranged alongside each other within the pair, however offset with respect to the adjacent pair.

It should be understood that the offset between adjacent columns is integer number of light sensitive elements such that each of the wavelength bands are associated with a mutually unique light sensitive element. Given as non-limiting examples, the wavelength separating units in adjacent columns may be offset by one, two, three, or four light sensitive elements.

According to an embodiment, the wavelength bands of each wavelength separating unit are ordered along the line in a descending manner with respect to wavelength.

It should be understood that a wavelength separating unit with the wavelength bands ordered along the line in an ascending manner with respect to wavelength is equivalent to a wavelength separating unit with the wavelength bands ordered along the line in a descending manner with respect to wavelength, which orientation has been turned by 180°.

Some embodiments may allow for a more straightforward definition of clusters of light sensitive elements associated with wavelength bands that are either the same or consecutive with respect to wavelength. By combining light sensitive elements associated with two different, but consecutive wavelength bands, a signal representing a wider wavelength continuous interval may be provided. By way of example, the present arrangement may be useful when the cluster are used for color representation in color images, since a more accurate color representation may be achieved.

According to an embodiment, each wavelength separating unit is configured to separate the incident light into three wavelength bands.

According to an embodiment, each wavelength separating unit is configured to separate the incident light into four wavelength bands.

By each wavelength separating unit providing at least three or at least four wavelength bands, imaging with good spectral resolution may be provided.

According to an embodiment, the wavelength range corresponds to a visible spectrum of light and wherein the wavelength bands respectively correspond to the red, green and blue portions of the visible spectrum of light.

Given as a non-limiting example, a wavelength band of 570-650 nm may be used to correspond to the color red. Given as another non-limiting example, a wavelength band of 500-600 nm may be used to correspond to the color green. Given as yet another non-limiting example, a wavelength band of 400-500 nm may be used to correspond to the color blue. The examples of the wavelength bands overlap partly, and it should be understood that the overlap may be different in different embodiments. Further, some embodiments may comprise wavelength regions that do not overlap. For some embodiments, at the wavelength at which one wavelength band ends, the adjacent wavelength band may start.

According to an embodiment, the clusters are configured such that the summed signals being combinations of the red, green and blue wavelength bands represent either the colors red, green and blue, or the colors yellow, cyan and magenta, or the colors red, yellow, cyan and blue.

Given as a non-limiting example, the color cyan may be represented by a cluster of light sensitive elements associated with a combination of green and blue wavelength bands. Given as another non-limiting example, the color yellow may be represented by a cluster of light sensitive elements associated with a combination of green and red wavelength bands. Given as yet another non-limiting example, the color magenta may be represented by a cluster of light sensitive elements associated with a combination of red and blue wavelength bands.

It should be understood that according to other embodiments, the wavelength separating units may split the light into other combinations of wavelength bands. Given as non-limiting examples, the wavelength bands may be other bands within the visible part of the spectrum, or the wavelength bands may be bands within the ultraviolet part of the spectrum, or the wavelength bands may be within the infrared part of the spectrum, or combinations thereof.

According to an embodiment, each of the wavelength separating units respectively comprise:

a first waveguide portion extending in a first direction and being configured to be a single-mode waveguide for the incident light within the wavelength range covering the number of wavelength bands;

a funnel element configured to receive the incident light and to funnel the incident light into a first end of the first waveguide portion;

a second waveguide portion extending along the first direction and in parallel with the first waveguide portion, and being configured to selectively guide light within one of the wavelength bands of the number of wavelength bands;

wherein said second waveguide portion is coupled to the first waveguide portion and configured to out-couple light from the first waveguide portion, within the wavelength band; and wherein a second end of the first waveguide portion and an end of the second waveguide portion, are configured to separately allow light transmitted through the first waveguide portion and the second waveguide portion to exit the respective waveguide portions in the first direction, thereby enabling the light to reach the light sensitive elements of the detector.

By the term "waveguide" is here meant any unit, device and/or element capable of transmitting light along a length direction, thereby providing transmission with low loss. In the present context the length direction is referred to as "first direction". Thus, the first direction corresponds to the main propagation direction of the light, with the funnel element and the detector arranged at opposite ends of the first waveguide portion, such that the incident light may be guided from the funnel element to the detector along the length direction of the first waveguide portion. Given as non-limiting examples, the waveguide may be a transparent dielectric waveguide or an optical fiber.

In the present disclosure, the term "transparent" refers to the physical material property of allowing light to pass through the material without being substantially scattered, such that it is possible to see clearly through the material. It should be understood that by the term "transparent" is here meant with respect to the wavelength band for which the waveguide is adapted to transmit. By way of example, for a waveguide adapted to transmit blue light, "transparent" is here meant that the waveguide is transparent to blue light. For wavelengths outside the blue wavelength band, such a waveguide may be transparent or partially transparent or opaque.

The first waveguide portion may be a waveguide capable of guiding a broader wavelength range than the second waveguide portion. In some embodiments, the first waveguide portion is a full spectrum waveguide such that it may transmit light within the full wavelength range intended to be detected. The first waveguide portion may be designed in relation to the full wavelength range to be guided by the first waveguide.

The second waveguide portion may be configured for out-coupling light within one of the wavelength bands within the wavelength range of the light received by the first waveguide portion. Thus, the second waveguide portion may be capable of sorting out a certain wavelength band of the incoming light. Given as a non-limiting example, if the wavelength range of the incident light corresponds to the full visible spectrum, the wavelength band of the second waveguide portion may correspond to red, green or blue light. The second waveguide portion may be designed in relation to the wavelength band of the light to be guided by the second waveguide portion.

The first and second waveguide portions may be arranged in parallel and side by side. The first and second waveguide portions may be aligned such that their respective end portions, through which the guided light exits the waveguide portions, are arranged at respective associated light sensitive elements of the detector. The end portions of the waveguide portions may be arranged in close proximity to the detector, or even in an abutting manner.

It should be understood that the wavelength separating unit is not limited to comprising only two waveguide portions.

By way of example, the wavelength separating unit may further comprise a third waveguide portion. The third waveguide portion may extend along the first direction and in parallel with the first waveguide portion. The third waveguide portion may be configured to selectively guide light within another one of the wavelength bands of the number of wavelength bands. By the present arrangement, a wavelength separating unit that may split the incident light into three wavelength bands may be provided.

By way of further example, the wavelength separating unit may further comprise a fourth waveguide portion, similar to the second and third waveguide portions, and may be configured to selectively guide yet another wavelength band. By the present arrangement, a wavelength separating unit that may split the incident light into four wavelength bands may be provided.

According to an embodiment, the clusters are arranged in a set of cluster rows, wherein each cluster row of the set of cluster rows extend in a straight line in parallel with the rows of light sensitive elements, and wherein the clusters in adjacent cluster rows are arranged to be spatially offset with respect to each other.

Given as a non-limiting example, clusters in adjacent cluster rows may be spatially offset by one light sensitive element with respect to each other. Given as another non-limiting example, clusters in adjacent cluster rows may be spatially offset by two light sensitive elements with respect to each other.

Some embodiments may provide more flexibility in defining the clusters, since the clusters may be arranged on the detector also in other patterns than in strict perpendicular cluster rows and cluster columns. In turn, the flexibility allows for more combinations of spectral information of the wavelength bands to be represented, whereby the multi-spectral content in the image detected by the detector is improved. By way of example, for a color image, more colors may be represented by the clusters, whereby the color content in the image may be widened.

According to a second aspect, there is provided a method for acquisition of a multi-spectral image, the method comprising:

collecting incident light;

passing the incident light within a wavelength range through a plurality of wavelength separating units, each wavelength separating unit being configured to spatially separate the incident light into a number of wavelength bands distributed along a line, wherein the line is a straight line;

detecting the light in the number of wavelength bands, by a detector comprising an array of light sensitive elements arranged in rows and columns, wherein each light sensitive element is configured to generate a signal dependent on an intensity of light incident onto the light sensitive element, wherein each wavelength band along the line is associated with a mutually unique light sensitive element, and wherein each of the rows is associated with more than one wavelength separating unit of the plurality of wavelength separating units, and each of the columns is associated with more than one wavelength separating unit of the plurality of wavelength separating units;

defining a number of mutually unique clusters of light sensitive elements wherein each cluster respectively forms a continuous area of the light sensitive elements;

summing signals from the light sensitive elements within the respective clusters, wherein each cluster comprises light sensitive elements associated with more than one wavelength separating unit of the plurality of wavelength separating units, and wherein each cluster comprises light sensitive elements associated with wavelength bands such that the summed signals represent a combination of the spectral information of the wavelength band, and wherein the summing the signals from the light sensitive elements within each of the mutually unique clusters respectively, is performed using hardware binning.

Effects and features of the second aspect are largely analogous to those described above in connection with the first aspect. Embodiments mentioned in relation to the first aspect are largely compatible with the second aspect. It is further noted that example embodiments are related and all combinations of features are possible unless explicitly stated otherwise.

For example, according to an embodiment the method may comprise defining a number of mutually unique clusters of light sensitive elements, wherein each cluster comprises light sensitive elements associated with wavelength bands being overlapping and/or adjacent with respect to wavelength such that the summed signals of each respective cluster represent a wavelength interval within the wavelength range.

According to another embodiment, the method may comprise passing the incident light within the wavelength range through the plurality of wavelength separating units, wherein the wavelength separating units are identical and wherein, along the respective rows, the wavelength separating units are arranged with alternating orientation with respect to an order of the wavelength bands along the line.

According to another embodiment, the method may comprise passing the incident light within the wavelength range through the plurality of wavelength separating units, wherein the wavelength bands of each wavelength separating unit are ordered along the line in a descending manner with respect to wavelength.

According to another embodiment, the method may comprise passing the incident light within the wavelength range through the plurality of wavelength separating units, wherein each wavelength separating unit is configured to separate the incident light into three wavelength bands or into four wavelength bands.

According to another embodiment, the method may comprise passing the incident light within the wavelength range through the plurality of wavelength separating units, wherein the wavelength range corresponds to a visible spectrum of light and wherein the wavelength bands respectively correspond to the red, green and blue portions of the visible spectrum of light.

According to another embodiment, the method may comprise defining a number of mutually unique clusters of light sensitive elements, wherein the clusters are configured such that the summed signals being combinations of the red, green and blue wavelength bands represent either the colors red, green and blue, or the colors yellow, cyan and magenta, or the colors red, yellow, cyan and blue.

According to another embodiment, the method may comprise passing the incident light within the wavelength range through the plurality of wavelength separating units, wherein each of the wavelength separating units (120) respectively comprise:

a first waveguide portion extending in a first direction and being configured to be a single-mode waveguide for the incident light within the wavelength range covering the number of wavelength bands (122);

a funnel element configured to receive the incident light and to funnel the incident light into a first end of the first waveguide portion;

a second waveguide portion extending along the first direction and in parallel with the first waveguide portion, and being configured to selectively guide light within one of the wavelength bands (122) of the number of wavelength bands (122);

wherein said second waveguide portion is coupled to the first waveguide portion and configured to out-couple light from the first waveguide portion, within the wavelength band (122); and wherein a second end of the first waveguide portion and an end of the second waveguide portion, are configured to separately allow light transmitted through the first waveguide portion and the second waveguide portion to exit the respective waveguide portions in the first direction, thereby enabling the light to reach the light sensitive elements (112) of the detector (110).

According to another embodiment, the method may comprise defining a number of mutually unique clusters of light sensitive elements, wherein the clusters are arranged in a set of cluster rows, wherein each cluster row of the set of cluster rows extend in a straight line in parallel with the rows of light sensitive elements, and wherein the clusters in adjacent cluster rows are arranged to be spatially offset with respect to each other.

Other features will be apparent from the following detailed disclosure, from the attached claims, and from the drawings.

BRIEF DESCRIPTION OF THE DRAWINGS

The above, as well as additional features will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description are described thereinafter according to example embodiments, being not used to limit the claimed scope. There are many different possibilities and the disclosure should not be construed as limited to the embodiments set forth herein; rather, these embodiments are provided for thoroughness and completeness, and fully convey the scope of the disclosure.

Figure 1A:
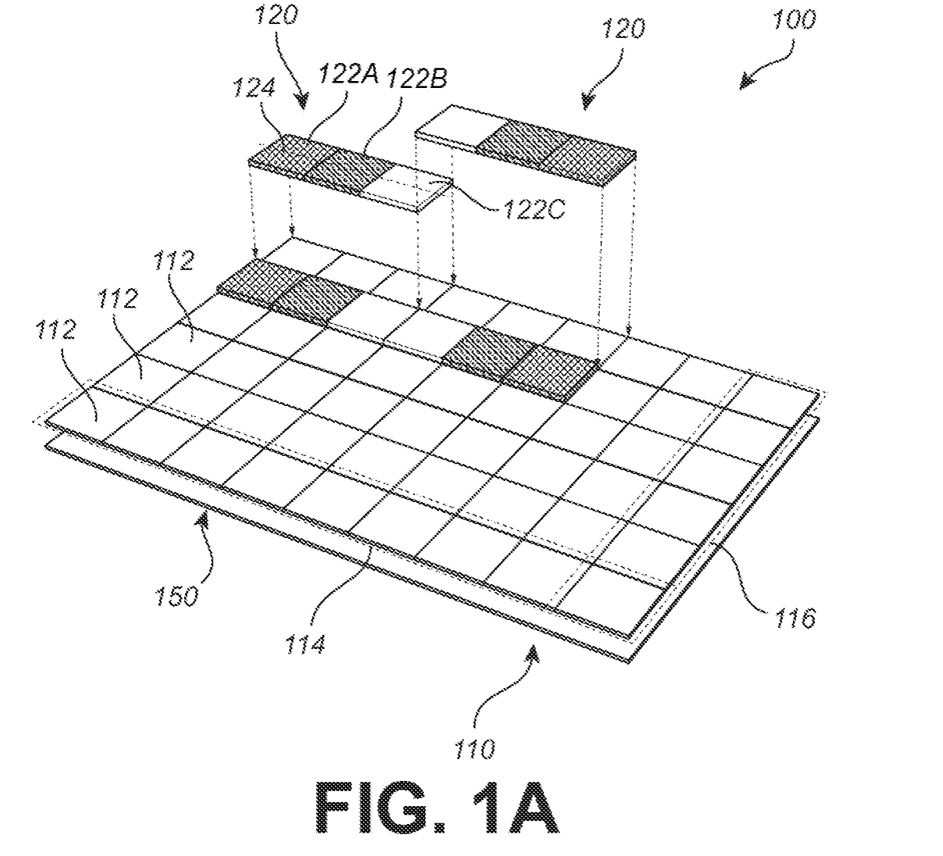
FIG. 1A schematically illustrates an imaging system with wavelength separating units of three wavelength bands, according to example embodiments.

FIG. 1A schematically illustrates an imaging system 100. The imaging system 100 is adapted for acquisition of multi-spectral images. Thus, at least two wavelength bands within a wavelength range of the acquisition, are acquired by different light sensitive elements. Typically, the wavelength bands are acquired simultaneously, however, for stationary objects to be images, also sequential acquisition of the wavelength bands is possible.

The imaging system 100 comprises a detector 110 comprising an array of light sensitive elements 112, arranged in rows 114 and columns 116 in a planar surface of the detector 110. Each light sensitive element 112 is configured to generate an electrical signal dependent on the intensity of light incident onto the light sensitive element 112. On top of the array of light sensitive elements 112 a plurality of wavelength separating units 120 is arranged. For clarity only four wavelength separating units 120 are illustrated, however it should be understood that in a practical embodiment the array of light sensitive elements 112 is fully covered, or at least mostly covered, by wavelength separating units 120.

Each wavelength separating unit 120 is configured to spatially separate incident light within the wavelength range into a number of wavelength bands 122 distributed along a straight line 124. In the example illustrated in FIG. 1A, each wavelength separating unit 120 separates incident light into three individual wavelength bands 122, however also a different number of wavelength bands 122 is conceivable. The wavelength bands 122 are illustrated with a lighter or darker shading, depending on light wavelengths within the respective wavelength bands 122, relative to each other. A lighter shading represents shorter wavelengths and a darker shading represents longer wavelength. Thus, in the illustration of FIG. 1A, the wavelength bands 122 of each wavelength separating unit 120 are ordered along the line 124 in a descending manner with respect to wavelength. By way of example, the wavelength band 122A may correspond to the color red, the wavelength band 122B may correspond to the color green, and the wavelength band 122C may correspond to the color blue. However, it should be understood that wavelength bands 122 may alternatively represent different wavelengths or colors, and may further comprise wavelengths outside the visible part of the spectrum, such as ultraviolet light or infrared light.

Each wavelength separating unit 120 is here schematically illustrated as a rectangle made up of three squares representing the wavelength bands 122. However, it should be understood that that the wavelength separating units 120 may have a more complex shape than illustrated, depending on the type of wavelength separating units 120. By way of example, the wavelength separating units 120 may comprise a number of waveguides, in the present case three waveguides in order to separate the incident light into wavelength bands 122, but may alternatively comprise a number of prisms, and/or gratings in order to separate the incident light into wavelength bands 122, or combinations thereof.

The line 124 of wavelength bands 122 of the respective wavelength separating units 120 is arranged to extend along a row 114 of the light sensitive elements 112. By the present arrangement, each wavelength band 122 along the line 124 is associated with the mutually unique light sensitive element 112 along the row 114. In this manner, light incident onto a wavelength separating unit 120 is split into three wavelength bands 122, and each respective wavelength band is distributed onto a mutually unique light sensitive element 112, such that the individual wavelength bands 122 are detected by individual light sensitive elements 112.

Along the respective rows 114, the wavelength separating units 120 are arranged continuously, one after the other. Such a manner of arranging the wavelength separating units 120 leaves no uncovered light sensitive elements 112 between the different wavelength separating units 120 along the rows 114. In other words, all the light sensitive elements 112 in each row 114 is covered by a wavelength separating unit 120. It should be noted, however, that if the number of light sensitive elements 112 along a row 114 is not a multiple of the number of wavelength bands 122 in the wavelength separating units 120, it is conceivable that a few light sensitive elements 112 along the perimeter of the array of light sensitive elements 112 may not be covered by wavelength separating units 120.

Each of the rows 114 is associated with more than one wavelength separating unit 120 of the plurality of wavelength separating units 120. Further, each of the columns 116 is associated with more than one wavelength separating unit 120 of the plurality of wavelength separating units 120. Thus, the full wavelength range including all wavelength bands 122 is repeated several times across the array of light sensitive areas 112 of the detector 110. This is different from for example a conventional spectrometer in which light is dispersed into a single repetition of the spectrum across the detector.

The imaging system 100 further comprises a processing unit 150 configured to define the number of mutually unique clusters of light sensitive elements 112, the details of which will be discussed in relation to the following figures.

Figure 1B:
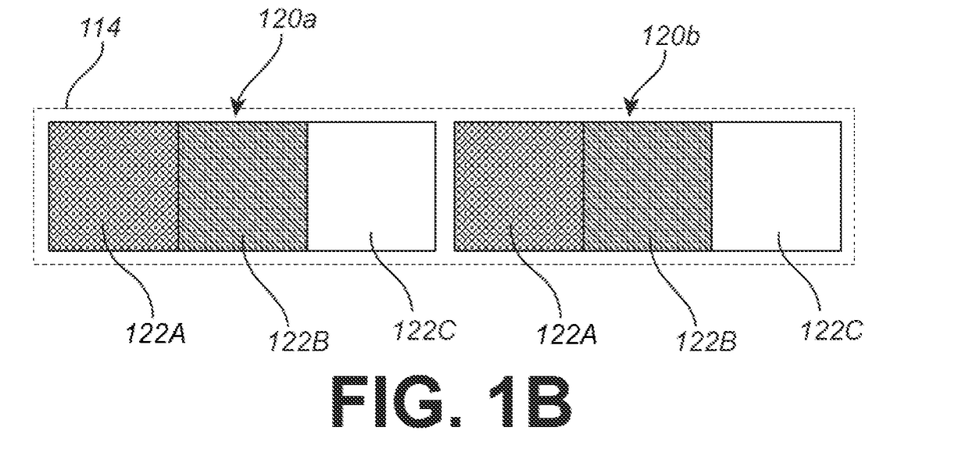
FIG. 1B schematically illustrates wavelength separating units arranged to have the same orientation with respect to the order of the wavelength bands, according to example embodiments.
Figure 1C:
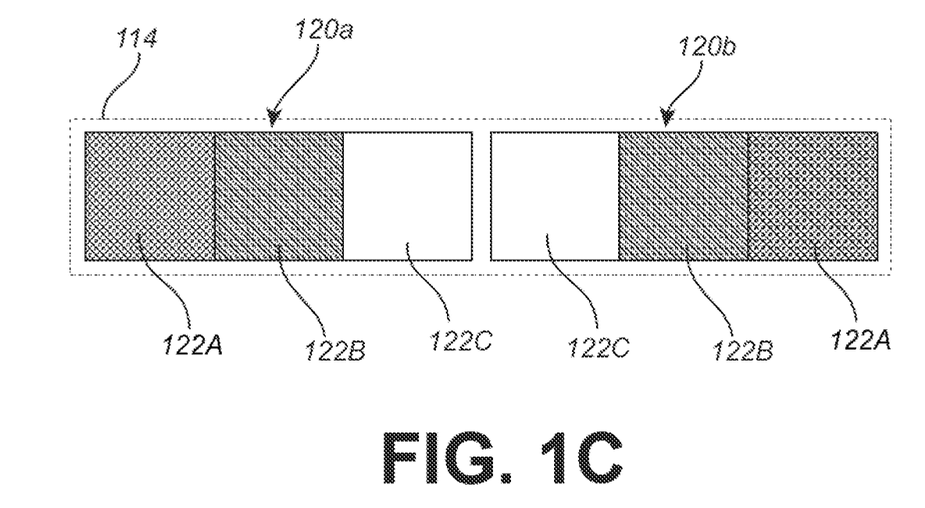
FIG. 1C schematically illustrates wavelength separating units arranged to have alternating orientation with respect to the order of the wavelength bands, according to example embodiments.

FIGS. 1B and 1C schematically illustrate two different manners in which the wavelength separating units 120 may be arranged on the detector 110 in order to form different patterns of the wavelength bands 122 on the light sensitive elements 112.

FIG. 1B schematically illustrates how the wavelength separating units 120a, 120b are arranged to have the same orientation with respect to the order of the wavelength bands 122A, 122B, 122C. In such an arrangement an end of one wavelength separating unit 120a is neighboring to the opposite end of the consecutive wavelength separating unit 120b. Hence, in the present illustration wavelength band 122C of wavelength separating unit 120a is neighboring to wavelength band 122A of wavelength separating unit 120b.

FIG. 1C schematically illustrates how the wavelength separating units 120a, 120b are arranged to have alternating orientation with respect to the order of the wavelength bands 122A, 122B, 122C. In such an arrangement an end of one wavelength separating unit 120a is neighboring to the same end of the consecutive wavelength separating unit 120b. Hence, in the present illustration wavelength band 122C of wavelength separating unit 120a is neighboring to wavelength band 122C of wavelength separating unit 120b.

Figure 2:
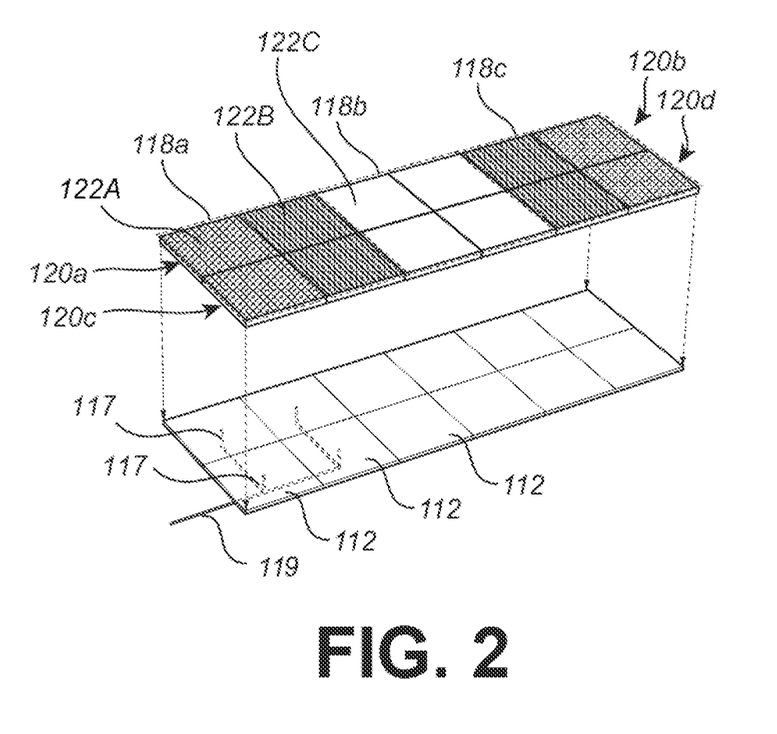
FIG. 2 schematically illustrates a number of mutually unique clusters of light sensitive elements, and how they relate to the associated wavelength bands, according to example embodiments.

FIG. 2 schematically illustrates a number of mutually unique clusters 118 of light sensitive elements 112, and how they relate to the associated wavelength bands 122. As mentioned in relation to FIG. 1A, the imaging system 100 further comprises a processing unit 150 configured to define the number of mutually unique clusters 118 of light sensitive elements 112. Each cluster 118 is formed by a number of light sensitive elements 112 located next to one another such that each cluster respectively forms a continuous area of the light sensitive elements 112. In the present embodiment, a cluster 118 is formed by two adjacent light sensitive elements 112 in one row, and two adjacent light sensitive elements 112 in an adjacent row, whereby a 2×2 cluster 118 is formed. The clusters 118 are defined such that each cluster 118 comprises light sensitive elements 112 associated with wavelength bands 122 of more than one wavelength separating unit 120.

The number of mutually unique clusters 118 are defined for summing signals from the light sensitive elements 112 within the respective clusters 118. Each cluster 118 is defined to comprise light sensitive elements 112 associated with wavelength bands 122 such that the summed signals represent a combination of the spectral information of the wavelength bands 122. In the example where the wavelength bands 122A, 122B, and 122C correspond to the colors red, green, and blue, respectively, the illustrated clusters 118a and 118c comprise wavelength bands of red and green, and may therefore be used as a representation for the color yellow. The cluster 118b on the other hand, only comprise wavelength bands corresponding to blue, and may therefore be used as a representation for the color blue.

The processing unit 150 is configured to perform hardware binning for summing the signals from the light sensitive elements 112 within each of the mutually unique clusters 118, respectively. Given only as an example, electrical charges, typically in the form of electrons, may be released in the respective light sensitive areas of the light sensitive elements 112 as a result of the incident light, to give rise to an electrical signal. By way of example, instead of reading out the charges from the light sensitive elements 112 separately, summing by hardware binning may be achieved by adding together the charges from the light sensitive elements 112 within the cluster 118, prior to reading out the charges. This is schematically illustrated as each of the light sensitive elements 112 having a lead 117, and that each of the leads 117 in the cluster 118 are combined into a common cluster output 119.

Using wavelength separating units 120 for splitting light into the different wavelength bands 122 along a straight line instead of using conventional color filtering for detection of different wavelength bands may allow most of the incident light reaches the detector 110, and is not absorbed or reflected by the different filters. The different wavelength bands 122 are redirected to different light sensitive elements 112, practically with its full intensity, and may thereby provide wavelength separating with very low light loss.

By defining clusters 118 of light sensitive elements 112 and summing the signals detected by the light sensitive elements 112 by hardware binning reduces the read-out noise of the light detection.

Creating certain wavelength band patterns with the linear wavelength separating units 120 on the detector 110 such that light in the wavelength bands 122 of the wavelength separating units 120 are directed to mutually unique light sensitive elements 112 of the detector 110, and defining clusters 118 of light sensitive elements 112 such that the clusters 118 may represent different spectral information such as different wavelength intervals, allows for wavelength separating units 120 to be combined with summing signals by hardware binning. In the manner described above, an imaging system 100 capable of multi-spectral imaging with high light sensitivity and thus good light detection properties even at low light levels may be provided. Such an imaging system 100 may be suitable for further downscaling.

In relation to the following figures, some specific embodiments will be discussed.

Figure 3:
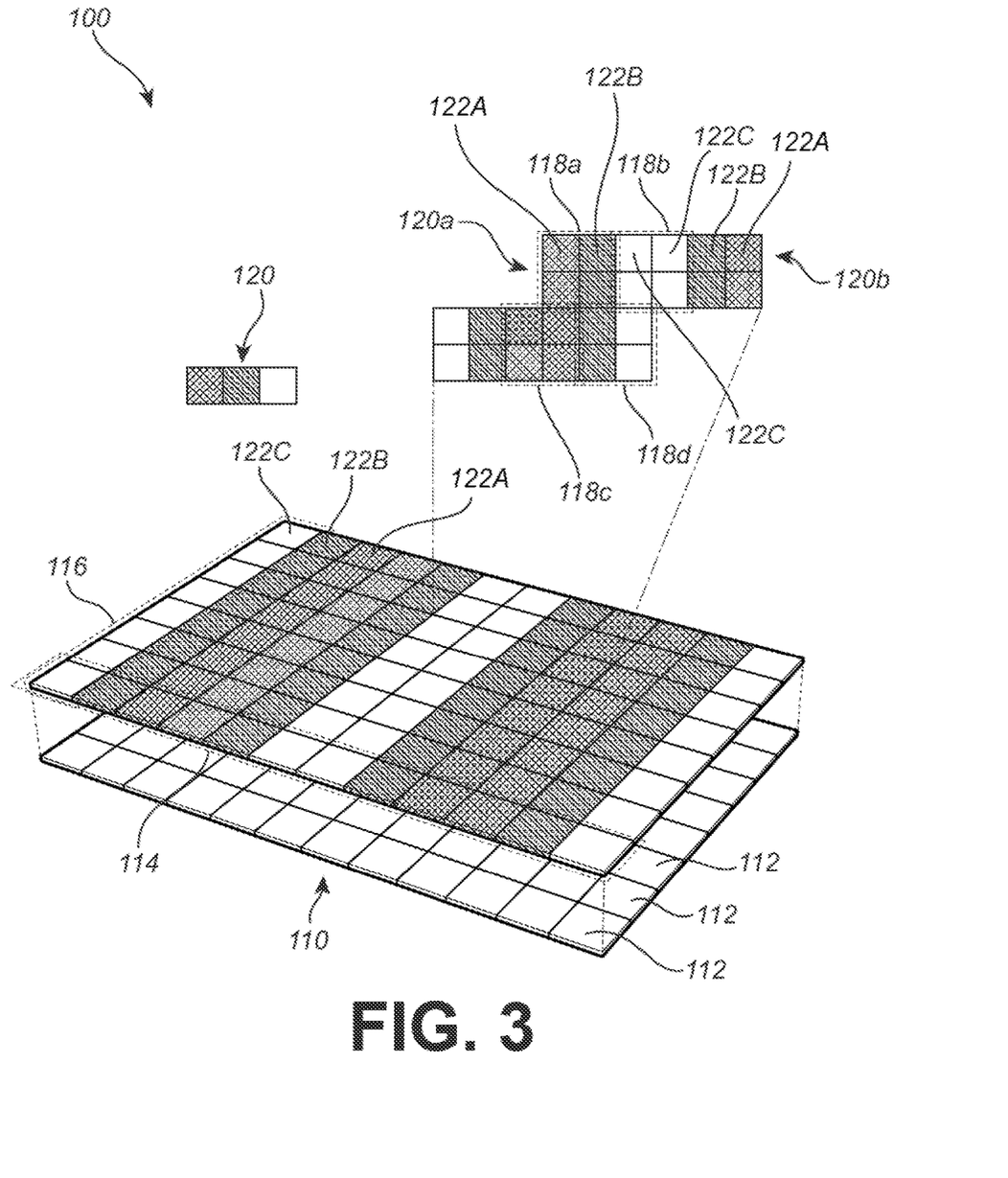
FIG. 3 schematically illustrates a portion of the pattern of wavelength separating units arranged with alternating orientation on the array of light sensitive elements of the detector, according to example embodiments.

FIG. 3 schematically illustrates a portion of the pattern of wavelength separating units 120 arranged on the array of light sensitive elements 112 of the detector 110 in the imaging system 100. It should be understood that in a practical imaging system 100 the number of light sensitive elements 112 on the detector 110 are typically much larger than what is schematically illustrated here. The pattern may therefore be repeated multiple times across the array in order to cover all, or at least most, light sensitive elements 112.

In the present embodiment, the wavelength separating units 120 in adjacent rows are arranged alongside one another. By the present arrangement, straight columns of wavelength separating units 120 are formed, extending parallel to the columns 116 of light sensitive elements 112. Thus, all light sensitive elements 112 along a column 116 of the detector 110 are associated with the same type of wavelength band 122.

Further, the wavelength separating units 120 are arranged to have alternating orientation with respect to the order of the wavelength bands 122. In such an arrangement an end of one wavelength separating unit 120a is neighboring to the same end of the consecutive wavelength separating unit 120b. Hence, in the present illustration wavelength band 122C of wavelength separating unit 120a is neighboring to wavelength band 122C of wavelength separating unit 120b.

The clusters 118 are arranged in a set of cluster rows, wherein each cluster row extends in a straight line in parallel with the rows 114 of light sensitive elements 112. Further, the clusters in adjacent cluster rows are arranged to be spatially offset with respect to each other. In the present arrangement, the clusters 118c and 118d are spatially offset by one light sensitive element 112 relative to clusters 118a and 118b, respectively.

As illustrated in FIG. 3, clusters may be defined to be associated with four different combinations of wave bands 122. Cluster 118c is associated with four wavelength bands 122A of the same type corresponding to the longest wavelengths. Cluster 118b is associated with four wavelength bands 122C of the same type corresponding to the shortest wavelengths. Cluster 118a is associated with four wavelength bands 122A, 122B, two of which correspond to the longest wavelengths and two of which correspond to the mid-range wavelengths. Cluster 118d is associated with four wavelength bands 122B, 122C, two of which correspond to the shortest wavelengths and two of which correspond to the mid-range wavelengths.

In the manner in which the wavelength separating units are arranged, the pattern of wavelength bands 122 is arranged such that the closest neighboring wavelength bands 122 to every respective wavelength band 122 is either of the same type with respect to wavelength, i.e. overlapping wavelength bands 122, or of a type adjacent with respect to wavelength, i.e. adjacent wavelength bands 122. Consequently, each cluster 118 comprises light sensitive elements 112 associated with wavelength bands 122 being overlapping and/or adjacent with respect to wavelength such that the summed signals of each respective cluster 118 represent a wavelength interval within the wavelength range of the incident light.

By way of example, the wavelength band 122A may correspond to the color red, the wavelength band 122B may correspond to the color green, and the wavelength band 122C may correspond to the color blue. The signals detected by the cluster 118a may correspond to both the color green and the color red, and the summed signal of cluster 118a may therefore be used to represent the color yellow. The signals detected by the cluster 118b may correspond to the color blue, and the summed signal of cluster 118b may therefore be used to represent the color blue. The signals detected by the cluster 118c may correspond to the color red, and the summed signal of cluster 118c may therefore be used to represent the color red. The signals detected by the cluster 118d may correspond to both the color green and the color blue, and the summed signal of cluster 118d may therefore be used to represent the color cyan.

However, it should be understood that wavelength bands 122 may alternatively represent different wavelengths or colors, and may further comprise wavelengths outside the visible part of the spectrum, such as ultraviolet light or infrared light. Further, the number of wavelength bands may alternatively be two, three, four, five, or higher, depending on how many wavelength bands may be of interest to detect.

Figure 4:
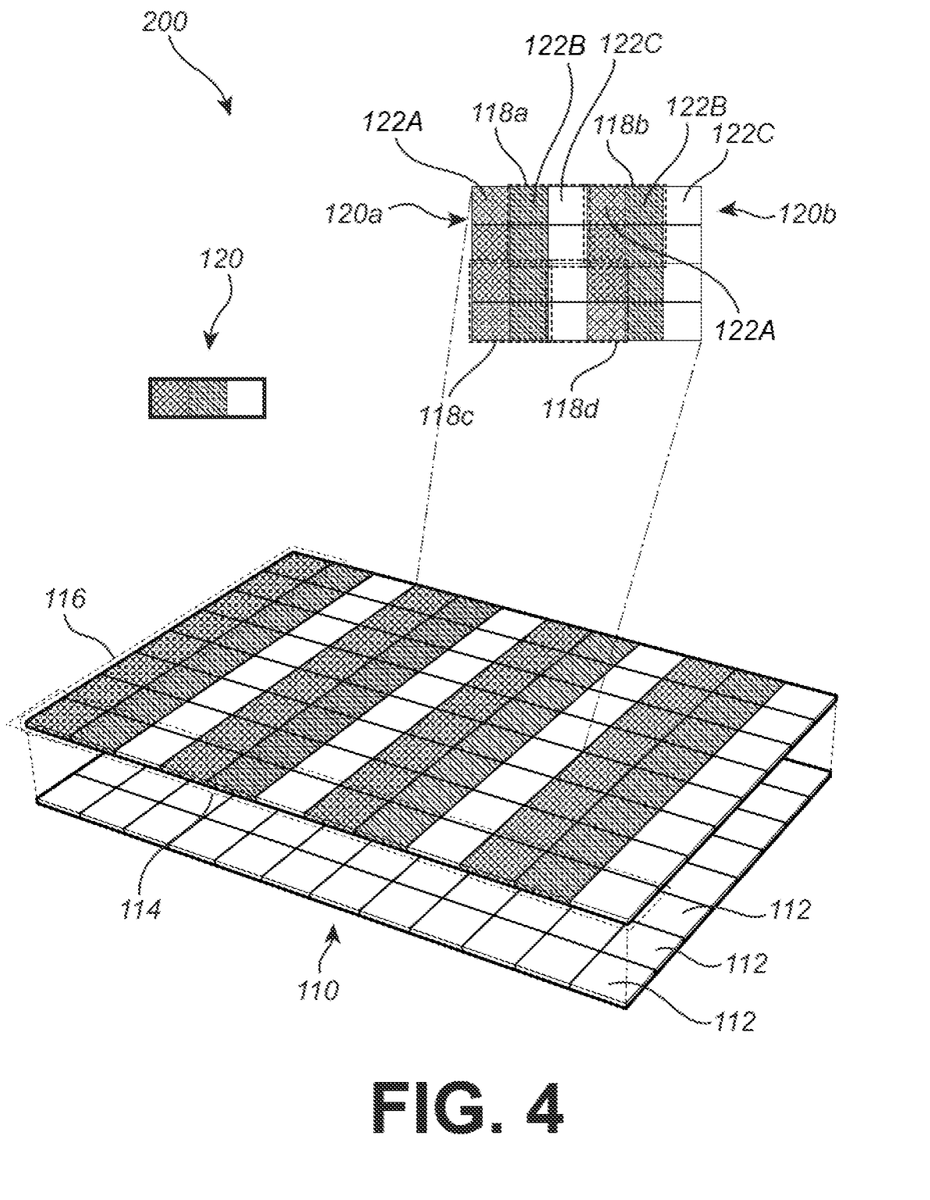
FIG. 4 schematically illustrates a portion of the pattern of wavelength separating units arranged with the same orientation on the array of light sensitive elements of the detector, according to example embodiments.

FIG. 4 schematically illustrates a portion of the pattern of wavelength separating units 120 arranged on the array of light sensitive elements 112 of the detector 110 in the imaging system 200. The imaging system 200 comprises the same components as the imaging system 100, the difference being that the wavelength separating units 120 are arranged in a different pattern as compared to the pattern of imaging system 100. Consequently, the summed signals of the cluster may correspond to different spectral information in imaging system 200, as compared to imaging system 100.

Similarly to the embodiment of imaging system 100, the wavelength separating units 120 in adjacent rows are arranged alongside one another, forming straight columns, extending parallel to the columns 116 of light sensitive elements 112. Thus, all light sensitive elements 112 along a column 116 of the detector 110 are associated with the same type of wavelength band 122, with respect to wavelength content.

The wavelength separating units 120 are arranged to have the same orientation with respect to the order of the wavelength bands 122 along each row. An end of one wavelength separating unit 120a is neighboring to an opposite end of the consecutive wavelength separating unit 120b. Hence, wavelength band 122C of wavelength separating unit 120a is neighboring to wavelength band 122A of wavelength separating unit 120b.

Similarly to imaging system 100, the clusters 118c and 118d of imaging system 200 are spatially offset by one light sensitive element 112 relative to clusters 118a and 118b, respectively.

In the present arrangement, clusters are defined to be associated with four different combinations of wave bands 122. Since the wavelength separating units 120 are arranged differently in imaging system 200 as compared to imaging system 100, the clusters will correspond to other combination of the wavelength bands 122.

Cluster 118a is associated with four wavelength bands 122B, 122C, two of which correspond to the shortest wavelengths and two of which correspond to the mid-range wavelengths. Clusters 118b, 118c are associated with four wavelength bands 122A, 122B, two of which correspond to the longest wavelengths and two of which correspond to the mid-range wavelengths. Cluster 118d is associated with four wavelength bands 122A, 122C, two of which correspond to the longest wavelengths and two of which correspond to the shortest wavelengths.

Since the wavelength separating units 120 of the present embodiment are arranged to be neighboring to adjacent wavelength separating units 120 at opposite ends, the embodiment allows for clusters to be defined to be a combination of the shortest wavelengths and the longest wavelengths, thus lacking spectral information of the mid-range wavelengths. Such clusters do not represent a continuous wavelength interval, due to the lack of the mid-range wavelengths. The imaging system 200 therefore allows for colors to be represented in different manners than with imaging system 100.

By way of example, the wavelength band 122A may correspond to the color red, the wavelength band 122B may correspond to the color green, and the wavelength band 122C may correspond to the color blue. The signals detected by the cluster 118a may correspond to both the color green and the color blue, and the summed signal of cluster 118a may therefore be used to represent the color cyan. The signals detected by the clusters 118b, 118c may correspond to both the color red and the color green, and the summed signal of clusters 118b, 118c may therefore be used to represent the color yellow. The signals detected by the cluster 118d may correspond to both the color red and the color blue, and the summed signal of cluster 118d may therefore be used to represent the color magenta.

Figure 5:
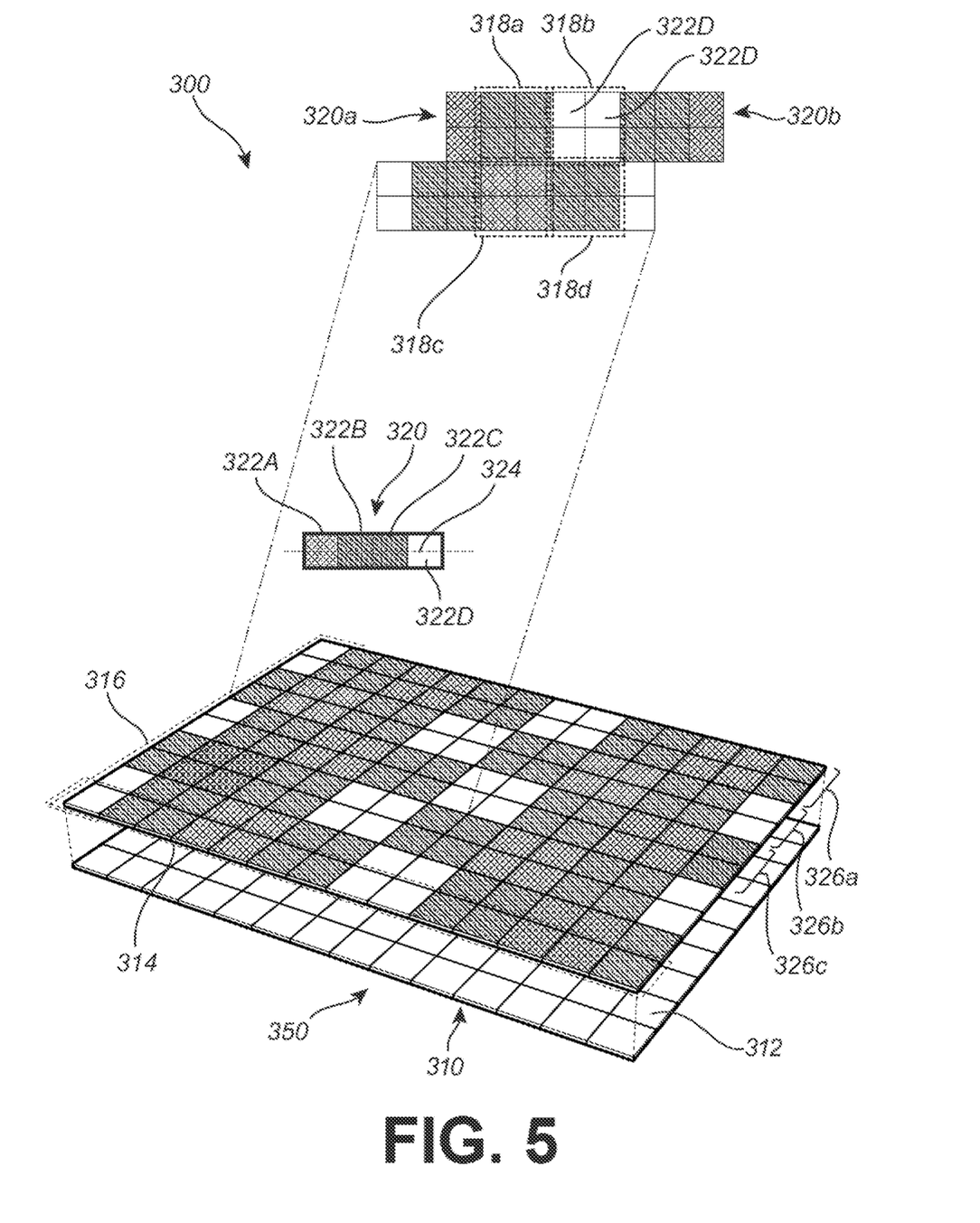
FIG. 5 schematically illustrates a portion of a pattern of wavelength separating units comprising four wavelength bands, arranged with alternating orientations and with offset on an array of light sensitive elements of a detector, according to example embodiments.

FIG. 5 schematically illustrates a portion of a pattern of wavelength separating units 320 arranged on an array of light sensitive elements 312 of a detector 310 in an imaging system 300.

Each wavelength separating unit 320 in the present embodiment is configured to separate the incident light into four wavelength bands 322. The wavelength bands 322 are distributed along a straight line 324 and ordered in a descending manner with respect to wavelength. The wavelength bands 322A, 322D at the ends correspond to the longest and shortest wavelengths, respectively, within the wavelength range. The two middle wavelength bands 322B, 322C correspond to the mid-range wavelengths within the wavelength range. In FIG. 5 the two middle wavelength bands 322B, 322C are illustrated as being identical, which may be the case in some variants of the embodiment. However, it is conceivable that in alternative variants, the two middle wavelength ranges 322B, 322C may correspond to slightly different wavelengths or may correspond to two different bands of the mid-range wavelengths.

The wavelength separating units 320 are arranged along the rows 314 of the detector 310. Along each row 314, the wavelength separating units 320 are arranged to have alternating orientation with respect to the order of the wavelength bands 322. In such an arrangement an end of one wavelength separating unit 320a is neighboring to the same end of the consecutive wavelength separating unit 320b. Hence, in the present illustration wavelength band 322D of wavelength separating unit 320a is neighboring to wavelength band 322D of wavelength separating unit 320b.

Further, the wavelength separating units 320 along adjacent rows 314 are paired such that in a first pair 326a, the wavelength separating units 320 are arranged alongside one another. In a second pair 326b, consecutive to the first pair 326a, the wavelength separating units 320 are also arranged alongside one another, however arranged to be offset in one direction along the rows 314 by two light sensitive elements 312 with respect to the first pair 326a. In a third pair 326c, consecutive to the second pair 326b, the wavelength separating units 320 are arranged alongside one another, however arranged to be offset by two light sensitive elements with respect to the second pair 326b. The third pair 326c is offset in the opposite direction to the second pair 326b, such that the third pair 326c is aligned with the first pair 326a along the columns 316.

The imaging system 300 further comprises a processing unit 350 configured to define the number of mutually unique clusters 318 of light sensitive elements 312. Each cluster 318 is formed by a number of light sensitive elements 312 located next to one another such that each cluster respectively forms a continuous area of the light sensitive elements 312.

In the present embodiment, a cluster 318 is formed by two adjacent light sensitive elements 312 in one row, and two adjacent light sensitive elements 312 in an adjacent row, whereby a 2×2 cluster 318 is formed. The clusters 318 are defined such that each cluster 318 comprises light sensitive elements 312 associated with wavelength bands 322 of more than one wavelength separating unit 320.

Further, the clusters 318 are arranged in a set of cluster rows extending in parallel with the rows 314 of light sensitive elements 312. Further, the clusters 318 in adjacent cluster rows are arranged alongside one another, thus without any offset.

In the present embodiment, clusters 318 may be defined to be associated with four different combinations of wave bands 322. Cluster 318b is associated with four wavelength bands 322D of the same type corresponding to the shortest wavelengths. Cluster 318c is associated with four wavelength bands 322A of the same type corresponding to the longest wavelengths. Cluster 318a and 118d are associated with four wavelength bands 322B, 322C, corresponding to the mid-range wavelengths. As mentioned previously, wavelength band 322B and wavelength band 322C may be identical or may correspond to two different wavelength bands within the mid-range wavelengths. However, the sum of the signals from the clusters 318a and 318d may represent the mid-range wavelength regardless of whether the wavelength bands 322B, 322C are identical or not.

By way of example, the wavelength band 322A may correspond to the color red, the wavelength bands 322B and 322C may correspond to the color green, and the wavelength band 322D may correspond to the color blue. The clusters 318a, 318b, 318c, 318d may thus be used to represent the colors green, blue, red, and green, respectively.

The wavelength band 322B and wavelength band 322C may be identical and may thus correspond to the color green. However, alternatively the wavelength bands 322B, 322C may correspond to two different wavelength bands. By way of example, wavelength band 122B may correspond to the color yellow, and wavelength band 122C may correspond to the color cyan. It should be noted that also other color combination within the mid-range of the visible part of the spectrum are conceivable. However, the sum of the signals from the clusters 318a and 318d may represent the color green regardless of whether the wavelength bands 322B, 322C are identical or not.

Figure 6:
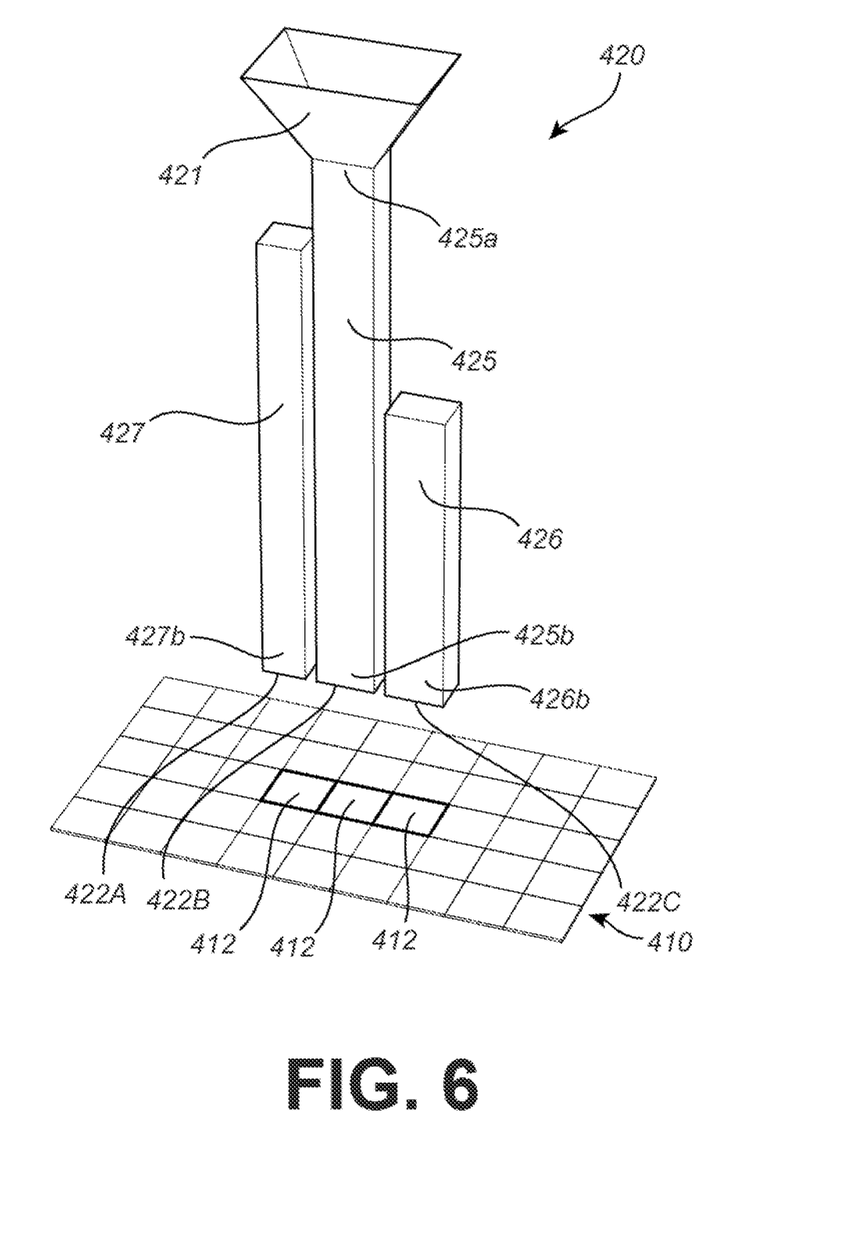
FIG. 6 schematically illustrates a wavelength separating unit comprising waveguides, according to example embodiments.

FIG. 6 schematically illustrates a wavelength separating unit 420 comprising waveguides. The wavelength separating unit 420 comprises a funnel element 421 configured to receive the incident light. The funnel element 421 is configured to funnel the incident light into a first end 425a of a first waveguide portion 425.

The first waveguide portion 425 extends in a first direction, such as a vertical direction, between the funnel element 421 and a light sensitive element 412 of a detector 410, such that the incident light can be guided from the funnel element 421 towards the detector 410. The first waveguide portion 425 is configured to be a single-mode waveguide for the incident light within the wavelength range covering the number of wavelength bands 422.

It should be understood that the funnel element 421 may be provided as a separate element for each of the first waveguide portions 425, or form part of a larger structure that is common for several waveguide portions.

The wavelength separating unit 420 further comprises a second waveguide portion 426 extending along the first direction and in parallel with the first waveguide portion 425. The second waveguide portion 426 is configured to selectively out-couple light within one of the wavelength bands 422 from the first waveguide portion 425, and to guide light towards the detector 410.

The wavelength separating unit 420 further comprises a third waveguide portion 427 extending along the first direction and in parallel with the first waveguide portion 425. The third waveguide portion 426 is configured to selectively out-couple light within another one of the wavelength bands 422 from the first waveguide portion 425, and to guide light towards the detector 410. It should be understood that, although the number of waveguides is here illustrated as being three, the number of waveguides may be any number from two and higher. Thus, the number of waveguides may be two, three, four, five, or higher, depending on how many wavelength bands may be of interest to detect.

It is conceivable that the sidewalls of each of the respective waveguides 425, 426, 427 may be substantially parallel to each other or that they may alternatively be tapered towards the detector 410.

A second end 425b of the first waveguide portion 425 and an end 426b, 427b of the second waveguide portion 426 and the third waveguide portion 427, respectively, are configured to separately allow light transmitted through the first waveguide portion 425, the second waveguide portion 426, and the third waveguide portion 427 to exit the respective waveguide portions 425, 426, 427 in the first direction, thereby enabling the light to reach the light sensitive elements 412 of the detector 410.

By way of example, in case the full wavelength range corresponds to the full visible part of the spectrum, the second waveguide portion 426 may be configured to out-couple and guide blue light, and the third waveguide portion 427 may be configured to out-couple and guide red light. By the present arrangement, the light remaining in the first waveguide portion 425 may be green light. In this manner, the colors red, green, and blue are allowed to be detected on separate light sensitive elements 412 of the detector 410.

Thanks to the use of the funnel element 421, light in focus at entrance end of the funnel element 421 can be captured in the funnel element 421 so as to propagate within the funnel element 421 and entered into the first end 425a of the first waveguide portion 425. This allows light to be propagated towards the detector 410 without a size of the first waveguide portion 425 being limited by a diffraction limit of light. Hence, size of light sensitive elements 412 may be very small allowing a high spatial resolution by the detector 410.

However, since light sensitive elements 412 may be very small, intensity of light at individual light sensitive elements 412 may be low. Thus, it may be beneficial to allow summing of signals from light sensitive elements 412 within a cluster so as to improve signal-to-noise ratio.

It should be understood that the wavelength separating unit 420 as described above may serve as wavelength separating units in any one of the embodiments of the imaging system 100, 200, 300. Further, it should be understood the wavelength separating unit 420 described above is only one example of how a wavelength separating unit may be structured. For example, a wavelength separating unit may alternatively comprise one or more gratings and/or one or more prisms to separate light with different wavelengths into a number of wavelength bands.

Figure 7:
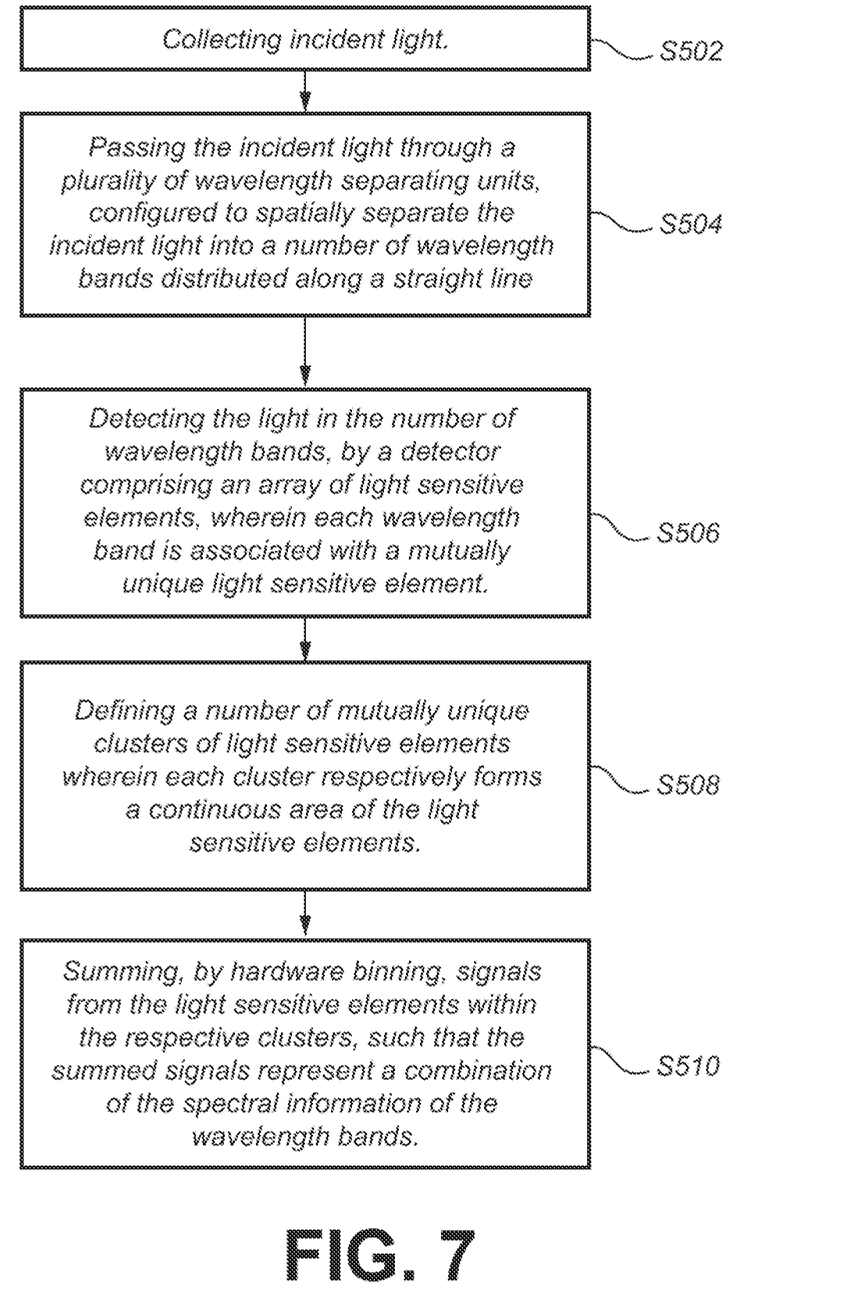
FIG. 7 illustrates a schematic block diagram shortly summarizing the method for acquisition of a multi-spectral image, according to example embodiments.

FIG. 7 illustrates a schematic block diagram shortly summarizing the method for acquisition of a multi-spectral image. It should be understood that the steps of the method, although listed in a specific order herein, may be performed in any order suitable.

The method may comprise collecting S502 incident light from an object or scene to be imaged.

The method may comprise passing S504 the incident light within a wavelength range through a plurality of wavelength separating units. Each wavelength separating unit may be configured to spatially separate the incident light into a number of wavelength bands distributed along a straight line.

The method may comprise detecting S506 the light in the number of wavelength bands, by a detector comprising an array of light sensitive elements arranged in rows and columns. Each light sensitive element may be configured to generate a signal dependent on an intensity of light incident onto the light sensitive element. Each wavelength band along the line may be associated with a mutually unique light sensitive element. Further, each of the rows is associated with more than one wavelength separating unit of the plurality of wavelength separating units, and each of the columns is associated with more than one wavelength separating unit of the plurality of wavelength separating units.

The method may comprise defining S508 a number of mutually unique clusters of light sensitive elements wherein each cluster respectively forms a continuous area of the light sensitive elements.

The method may comprise summing S510 signals from the light sensitive elements within the respective clusters. Each cluster may comprise light sensitive elements associated with more than one wavelength separating unit of the plurality of wavelength separating units. Each cluster may comprise light sensitive elements associated with wavelength bands such that the summed signals represent a combination of the spectral information of the wavelength band. The summing S510 the signals from the light sensitive elements within each of the mutually unique clusters respectively, may be performed using hardware binning.

In the above, the inventive concept has mainly been described with reference to a limited number of examples.

However, as is readily appreciated, other examples than the ones disclosed above are equally possible within the scope of the disclosure, as defined by the appended claims.

What is claimed is:

1. An imaging system comprising:
a detector comprising an array of light sensitive elements arranged in rows and columns, wherein each light sensitive element is configured to generate a signal dependent on an intensity of light incident onto the light sensitive element;
a plurality of wavelength separating units, wherein each wavelength separating unit is configured to spatially separate incident light within a wavelength range into a number of wavelength bands distributed along a line, wherein the line is a straight line, wherein each wavelength band along the line is associated with a mutually unique light sensitive element, wherein each of the rows is associated with more than one wavelength separating unit of the plurality of wavelength separating units, and wherein each of the columns is associated with more than one wavelength separating unit of the plurality of wavelength separating units; and
a processing unit configured to define a number of mutually unique clusters of light sensitive elements for summing signals from the light sensitive elements within the respective clusters, wherein each cluster respectively forms a continuous area of the light sensitive elements, wherein each cluster comprises light sensitive elements associated with more than one wavelength separating unit of the plurality of wavelength separating units, wherein each cluster comprises light sensitive elements associated with wavelength bands such that the summed signals represent a combination of the spectral information of the wavelength bands, and wherein the processing unit is configured to perform hardware binning for summing the signals from the light sensitive elements within each of the mutually unique clusters respectively.

2. The imaging system according to claim 1, wherein each cluster comprises light sensitive elements associated with wavelength bands being overlapping or adjacent with respect to wavelength such that the summed signals of each respective cluster represent a wavelength interval within the wavelength range.

3. The imaging system according to claim 1,
wherein the line of wavelength bands of each of the wavelength separating units is arranged to extend along a row of the light sensitive elements such that each wavelength band along the line is associated with the mutually unique light sensitive element along the row, and
wherein, along the respective rows, the wavelength separating units are arranged continuously, one after the other.

4. The imaging system according to claim 3, wherein the wavelength separating units are identical, and wherein, along the respective rows, the wavelength separating units are arranged with alternating orientation with respect to an order of the wavelength bands along the line.

5. The imaging system according to claim 3, wherein the wavelength separating units in adjacent rows are arranged side by side forming columns of wavelength separating units parallel to the columns of light sensitive elements.

6. The imaging system according to claim 3, wherein the wavelength separating units in adjacent rows are arranged to be offset with respect to each other.

7. The imaging system according to claim 1, wherein the wavelength bands of each wavelength separating unit are ordered along the line in a descending manner with respect to wavelength.

8. The imaging system according to claim 1, wherein each wavelength separating unit is configured to separate the incident light into three wavelength bands.

9. The imaging system according to claim 1, wherein each wavelength separating unit is configured to separate the incident light into four wavelength bands.

10. The imaging system according to claim 9, wherein the wavelength range corresponds to a visible spectrum of light, and wherein the wavelength bands comprise the red, green, and blue portions of the visible spectrum of light.

11. The imaging system according to claim 10, wherein the clusters are configured such that the summed signals being combinations of the red, green, and blue wavelength bands represent:
the colors red, green, and blue; or
the colors yellow, cyan, and magenta; or
the colors red, yellow, cyan, and blue.

12. The imaging system according to claim 1, wherein each of the wavelength separating units respectively comprise:
a first waveguide portion extending in a first direction and being configured to be a single-mode waveguide for the incident light within the wavelength range covering the number of wavelength bands;
a funnel element configured to receive the incident light and to funnel the incident light into a first end of the first waveguide portion; and
a second waveguide portion extending along the first direction and in parallel with the first waveguide portion and being configured to selectively guide light within one of the wavelength bands of the number of wavelength bands,
wherein the second waveguide portion is coupled to the first waveguide portion and configured to out-couple light from the first waveguide portion, within the wavelength band, and
wherein a second end of the first waveguide portion and an end of the second waveguide portion are configured to separately allow light transmitted through the first waveguide portion and the second waveguide portion to exit the respective waveguide portions in the first direction, thereby enabling the light to reach the light sensitive elements of the detector.

13. The imaging system according to claim 1, wherein the clusters are arranged in a set of cluster rows, wherein each cluster row of the set of cluster rows extend in a straight line in parallel with the rows of light sensitive elements, and wherein the clusters in adjacent cluster rows are arranged to be spatially offset with respect to each other.

14. A method for acquisition of a multi-spectral image, wherein the method comprises:
collecting incident light;
passing the incident light within a wavelength range through a plurality of wavelength separating units, each wavelength separating unit being configured to spatially separate the incident light into a number of wavelength bands distributed along a line, wherein the line is a straight line;
detecting the light in the number of wavelength bands, by a detector comprising an array of light sensitive elements arranged in rows and columns, wherein each light sensitive element is configured to generate a signal dependent on an intensity of light incident onto the light sensitive element, wherein each wavelength band along the line is associated with a mutually unique light sensitive element, wherein each of the rows is associated with more than one wavelength separating unit of the plurality of wavelength separating units, and wherein each of the columns is associated with more than one wavelength separating unit of the plurality of wavelength separating units;

defining a number of mutually unique clusters of light sensitive elements, wherein each cluster respectively forms a continuous area of the light sensitive elements; and summing signals from the light sensitive elements within the respective clusters, wherein each cluster comprises light sensitive elements associated with more than one wavelength separating unit of the plurality of wavelength separating units, wherein each cluster comprises light sensitive elements associated with wavelength bands such that the summed signals represent a combination of the spectral information of the wavelength band, and wherein the summing the signals from the light sensitive elements within each of the mutually unique clusters respectively, is performed using hardware binning.

15. The method according to claim 14, wherein each cluster comprises light sensitive elements associated with wavelength bands being overlapping or adjacent with respect to wavelength such that the summed signals of each respective cluster represent a wavelength interval within the wavelength range.

16. The method according to claim 14, wherein the line of wavelength bands of each of the wavelength separating units is arranged to extend along a row of the light sensitive elements such that each wavelength band along the line is associated with the mutually unique light sensitive element along the row, and wherein, along the respective rows, the wavelength separating units are arranged continuously, one after the other.

17. The method according to claim 16, wherein the wavelength separating units are identical, and wherein, along the respective rows, the wavelength separating units are arranged with alternating orientation with respect to an order of the wavelength bands along the line.

18. The method according to claim 16, wherein the wavelength separating units in adjacent rows are arranged side by side forming columns of wavelength separating units parallel to the columns of light sensitive elements.

19. The method according to claim 16, wherein the wavelength separating units in adjacent rows are arranged to be offset with respect to each other.

20. The method according to claim 14, wherein the wavelength bands of each wavelength separating unit are ordered along the line in a descending manner with respect to wavelength.

* * * * *